United States Patent [19]

Brasfield

[11] 4,321,644
[45] Mar. 23, 1982

[54] POWER LINE TRANSIENT LIMITER

[75] Inventor: Robert G. Brasfield, Seattle, Wash.

[73] Assignee: The Boeing Company, Seattle, Wash.

[21] Appl. No.: 42,279

[22] Filed: May 24, 1979

[51] Int. Cl.³ .............................................. H02H 7/20
[52] U.S. Cl. ....................................... 361/56; 361/91; 307/252 T
[58] Field of Search ........................ 361/56, 91, 88, 89, 361/110, 111, 71, 54, 55; 307/252 T, 252 H, 252 J, 252 K, 264, 266

[56] References Cited

U.S. PATENT DOCUMENTS

| | | | |
|---|---|---|---|
| 3,213,349 | 10/1965 | Gutzwiller | 361/56 X |
| 3,375,405 | 3/1968 | Fallon et al. | 361/56 |
| 3,456,084 | 7/1969 | Haselton, Jr. | 307/252 H X |
| 3,571,660 | 3/1971 | Phillips | 361/56 |
| 3,793,535 | 2/1974 | Chowdhuri | 361/111 |
| 3,947,726 | 3/1976 | DeCecco et al. | 361/91 X |
| 3,968,407 | 7/1976 | Wilson | 361/56 X |
| 4,118,749 | 10/1978 | Matuzaki et al. | 361/56 X |

FOREIGN PATENT DOCUMENTS 2444910  4/1976  Fed. Rep. of Germany ........ 361/91

Primary Examiner—Patrick R. Salce
Attorney, Agent, or Firm—James P. Hamley; B. A. Donahue

[57] ABSTRACT

The transient limiter suppresses high voltage transients induced on an alternating current (AC) carrying power line. A Zener diode string breaks down for voltages on the line which exceed the peak AC voltage. The breakdown current is directly connected to the gate terminals of a pair of silicon controlled rectifiers (SCR's). Each rectifier is series connected to a voltage responsive resistor with the combination being connected across the power line terminals. Upon breakdown of the Zener diode string one of the SCR's and its associated voltage responsive resistor switch to a low impedance state, thereby limiting the peak voltage on the power line.

3 Claims, 2 Drawing Figures

POWER LINE TRANSIENT LIMITER

BACKGROUND OF THE INVENTION

This invention pertains to the electrical power art and, more particularly, to a means for suppressing high voltage transients induced on an alternating current carrying line. Overvoltage protectors are well known in the prior art. FIG. 1 is a schematic diagram of an overvoltage protector for use in a commercial airplane. Here, the airplane's generator 10 produces at its output terminals 12, 14 an AC voltage having a nominal peak value of 162 volts at a frequency of 400 hertz. The output from the generator 10 is passed through a feeder inductance 16, here represented as a lumped inductance, to the feeder line 20. Feeder line 20, as well as generator 10, are subject to induced high voltage transients, such as may occur due to a lightning strike on the aircraft. The high induced voltages may result in damage to the aircraft's electrical equipment, illustrated as load 22. Thus, a lightning protector, indicated generally at 24, is provided between the generator's terminals 12, 14.

The lightning protector 24 includes a voltage sensing device 30 which is wired directly across the generator's terminals 12, 14 and includes internal circuitry (not shown) which senses the voltage on the line. If the peak voltage exceeds 250 volts, the voltage sensing device 30 produces a trigger signal at its outputs 32, 34. While a detailed schematic diagram of the voltage sensing device 30 is not shown herein, such circuits are well known to the prior art.

The trigger signals produced at the outputs 32, 34 of the voltage sensing device 30 are coupled via transformers 40, 42, respectively, to the gate—cathode connections of a pair of silicon controlled rectifiers 50, 52. The silicon controlled rectifiers 50, 52 are connected in parallel and in reverse polarity such that the anode of one rectifier connects to the cathode of the other. As shown, the common connection of the anode of the first silicon controlled rectifier 50 with the cathode of the second 52 connects to the second generator terminal 14.

The common connection formed by the cathode of the first SCR 50 and the anode of the second SCR 52 connects through a network, indicated generally at 60, formed by the parallel connection of a capacitor 62 and a resistor 64 to the feeder line 20.

Operation of the prior art voltage protector 24 shown in FIG. 1 may be understood as follows. During normal operation of the system, the voltage produced by the generator 10 at its output terminals 12, 14 does not rise to the threshold of the voltage sensing circuit 30 and thus the SCR's 50, 52 are biased off. Capacitor 62, thus, is normally discharged and, in effect, is connected only to the generator feeder line 20.

If the transient voltage, such as may be caused by lightning, is induced onto the generator feeder 20, it is detected by the voltage sensing device 30 once it has risen to 250 volts. A trigger voltage is then applied to the gates of both SCR's 50 and 52. One of these will be switched on depending upon whether the feeder voltage is positive or negative. That is, SCR 50 is switched on for negative feeder voltages whereas SCR 52 will switch on for positive feeder voltages. The switching on of one of the devices 50, 52 causes one end of capacitor 62 to be clamped near the potential at generator line 14, which potential is commonly airplane ground.

The subject matter of the instant invention includes the recognition of inherent limitations in the prior art design which render it incapable of accomplishing its desired purpose under all conditions. One problem with previous transient limiters of this type is that they rely on internally stored energy to supply the trigger generation circuit, which stored energy may be depleted by the operation of the circuit during occurrence of a transient. The transient limiter is then unresponsive for a certain period of time until the trigger circuit energy store is replenished. This energy store has typically been charge on a capacitor.

Another potential cause of unresponsive trigger circuitry lies in the use of transformers to couple the trigger signals to the SCR's. The production of one trigger signal may leave the transformer core flux in a state such that a core flux resetting action is necessary before a second trigger signal of equal power can be produced.

When either, or both of these causes operate to reduce the power level of the trigger signals for a brief period after a transient supression action, the transient limiter may be rendered ineffective in suppressing additional transients that occur during recovery time.

SUMMARY OF THE INVENTION

It is an object of this invention, therefore, to provide a transient limiter apparatus which does not require recovery time.

It is a particular object of the invention to provide the above described improved transient limiter apparatus which does not rely on stored trigger energy.

Briefly, according to the invention, a transient limiter for suppressing high voltage transients on a power line, which power line normally carries an alternating current having a predetermined peak to peak voltage value, includes voltage sensing means which monitors the voltage on the line and produces a trigger current in response to the line voltage exceeding a predetermined limit representative of a high voltage transient. Solid state switching means is switchable from a high to a low impedance state in response to the trigger current being connected in a direct current path to a control terminal of the solid state switching means. A voltage responsive resistance means is connected in series with the switching means. The voltage responsive resistance means switches to a low impedance state in response to an applied high voltage. Suitable means connects the series combination of the solid state switching means and the voltage responsive resistance means across the terminals of the power line.

Preferably, to improve limiter response time, a differentiator means produces a trigger current in response to the rate of rise of a transient on the line exceeding a predetermined limit. Appropriate means connects the differentiator produced trigger current to the solid state switching means.

DETAILED DESCRIPTION OF THE PREFERRED EMBODIMENT OF THE INVENTION

Figure 1:
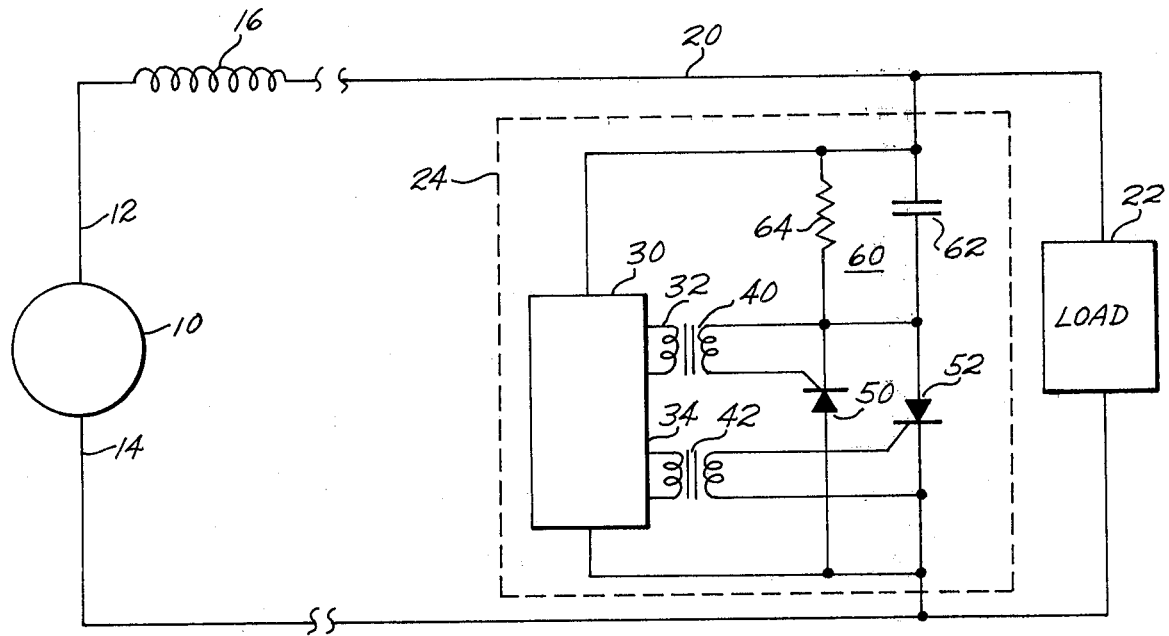
FIG. 1 is a schematic diagram of a transient limiter known in the aircraft art.

FIG. 1, as is more fully described herein below, illustrates a conventional airplane electrical system wherein a generator 10 produces at its output terminals 12, 14 a predetermined value peak to peak alternating current. The current passes through a feeder inductance 16 and on to aircraft electrical equipment, indicated as load 22. To protect the equipment from high voltage transients on the line, a lightning protector 24 is employed. The protector includes a voltage sensing circuit 30 which, when the voltage on the line exceeds a predetermined level representative of a high voltage transient produces trigger signals at its outputs 32, 34. The trigger signals are coupled to the gates of a pair of SCR's 50, 52. The SCR's 50, 52 are connected in parallel and in opposite polarity and are series connected with a network comprised of capacitor 62 and resistor 64 between the terminals of the power line. Since the voltage sensing circuit 30 activates an appropriate one of the SCR's 50, 52 during the occurrence of a high voltage transient, this transient is thus limited by action of the SCR switching to a low impedance and coupling the network 60 directly across the line.

It has been found that the transient limiter 24 of the prior art suffers faults under repetitive transients due to the transformers 40, 42 and also to the storage circuit within circuit 30.

Figure 2:
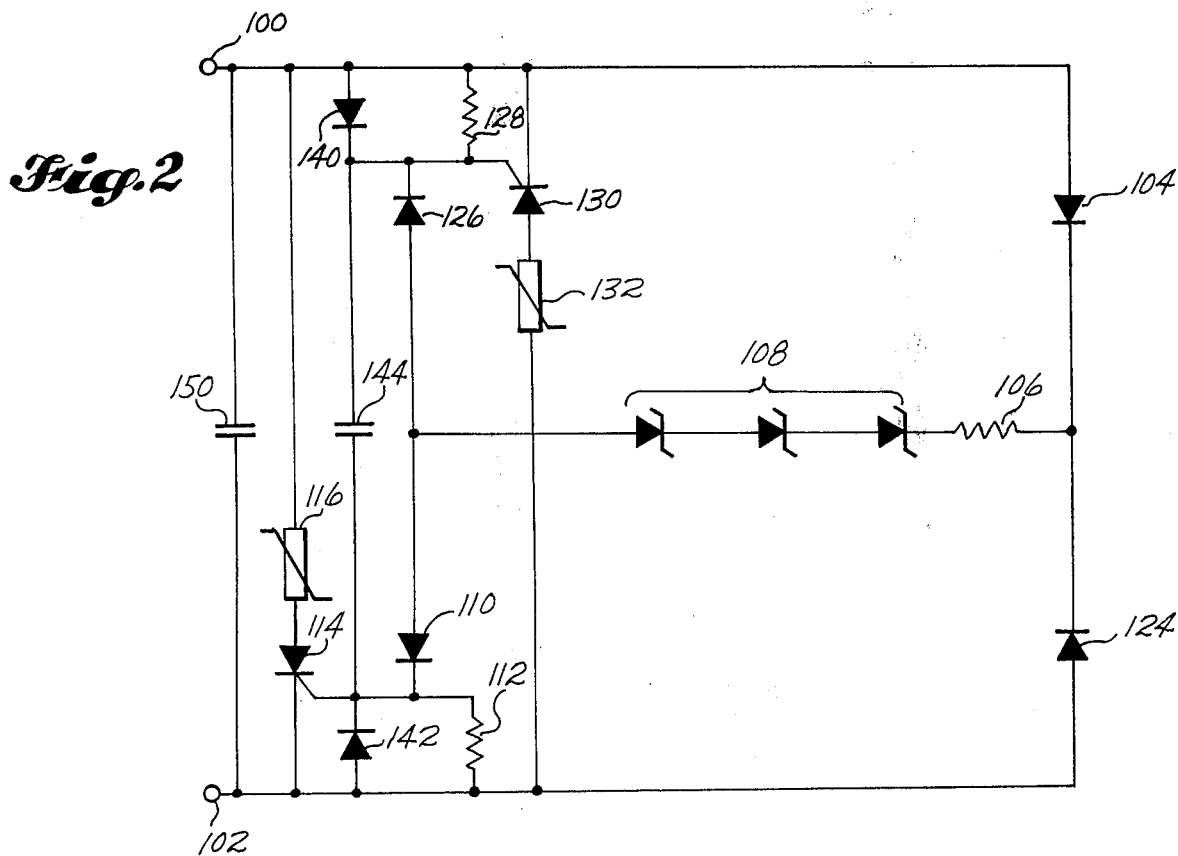
FIG. 2 is a schematic diagram of the preferred embodiment of the transient limiter according to the invention.

FIG. 2 is a detailed schematic diagram of the preferred embodiment of the transient limiter according the the invention. Here, a pair of terminals 100, 102 are adapted to couple across the power line, in the same manner as the transient limiter 24 shown in FIG. 1.

Operation of the circuit shown in FIG. 2 may be understood as follows. Assume first that the nature of the transient is such that the voltage at terminal 100 is positive with respect to the voltage at terminal 102. In this condition, a first current steering diode 104 is forward biased and passes the transient through a current limiting resistor 106 to a Zener diode string 108. The Zener diode string 108 is selected such that it breaks down at the desired voltage of transient limiter protection. This would normally be a safe margin above the highest peak voltage produced by the AC generator.

Upon breakdown of the Zener diode string 108, a trigger current is passed through the second current steering diode 110 and through resistor 112 to the second transient limiter terminal 102. If the trigger current is high enough, the voltage developed across resistor 112 is sufficient to turn on a first silicon controlled rectifier (SCR) 114 by application of a positive voltage at its gate terminal. Silicon controlled rectifier 114 has its cathode connected to terminal 102 and its anode coupled to terminal 100 through a voltage variable resistor 116. Voltage variable resistor 116, acting in the known manner, will switch from a high to a low impedance in response to the occurrence of a sufficient voltage across terminals 100, 102 and the current path provided through SCR 114. This action, thus, suppresses or limits the transient on the line.

Should the transient cause terminal 102 to be of positive polarity relative to the voltage at terminal 100, the third current steering diode 124 is forward biased thus allowing the transient to also appear across the current limiting resistor 106 and Zener diode chain 108. Again, if the Zener diode chain 108 should breakdown, trigger current passes through the fourth current steering diode 126 and produces a voltage across a resistor 128. The gate of a second SCR 130 connects to resistor 128 such that if the voltage thereacross exceeds the firing potential of SCR 130, the SCR is switched to a low impedance state. Now, if the voltage across the line is suffi-cient a second voltage variable resistor 132 will switch to a low impedance state and, as before, limit or suppress the transient.

It should be observed that, for the embodiment of FIG. 2, to previous events, whenever the transient voltage existing between terminals 100, 102 is greater than the predetermined breakdown voltage of Zener diode string 108, trigger signals for the appropriate SCR will be available, with power for the triggering action being derived from the transient itself. Also of note is that the current steering diodes 104, 110, 124 and 126 direct the trigger signal to the particular SCR which is required to operate to accomplish suppression.

Capacitor 150, operating in conjunction with the feeder inductance 16, as shown in FIG. 1, reduces the rate of rise of the transient voltage between terminals 100, 102. The value of capacitor 150 is selected to prevent the transient voltage from rising to an unacceptable level during the turn on delay of the SCR's.

The response time is enhanced by the inclusion of diodes 140, 142, a capacitor 144 and resistors 112, 128. Once again, assuming a positive high voltage transient on terminal 100 with respect to terminal 102, diode 140 is forward biased causing the transient to be coupled through capacitor 144 and appear across resistor 112. The values of capacitor 144 and resistor 112 can be selected such that for a given rate of rise of the transient signal, sufficient voltage appears across resistor 112 to bias on SCR 114 and thus initiate transient suppression. In this mode, trigger current to SCR 114 is provided prior to the breakdown of Zener diode string 108.

Similarly, for the condition wherein the transient on terminal 102 is positive with respect to that at terminal 100, the transient is coupled through diode 142 and capacitor 144 to resistor 128. The values of capacitor 144 and resistor 128 can be chosen such that transient suppression is initiated for the condition of transient signals which exhibit a given rise time.

Thus, capacitor 144, along with resistors 112, 128 define a differentiator circuit whose time constant can be selected to initiate transient suppression under a given rise time condition.

In summary, an improved transient limiter has been described which does not require recovery time.

While a preferred embodiment of the invention has been described in detail, it should be apparent that many modifications and variations thereto are possible, all of which fall within the true spirt and scope of the invention.

I claim:
1. A transient limiter for suppressing high voltage transients of either polarity on a power line, which power line normally carries an alternating current having a predetermined peak to peak voltage value, the transient limiter comprising:
  a pair of voltage responsive resistance means, each voltage responsive resistance means switching to a low impedance state responsive to a high voltage being applied thereacross;
  a pair of silicon controlled rectifiers (SCR's), each SCR having its cathode connected to one of the power line terminals and its anode connected through one of said voltage responsive resistance means to the remaining power line terminal, and the gates of each SCR being responsive to a trigger signal to actuate said SCR to a low impedance state;

voltage sensing means for monitoring the voltage across the line and producing a trigger signal in response to said voltage exceeding a predetermined limit representative of a high voltage transient;

means for applying said trigger signal to a predetermined one of said SCR gates responsive to the polarity of the transient; and rate control means for capacitively coupling a rate of voltage rise above a predetermined limit on said line directly to a predetermined one of the gates of said SCR's responsive to the polarity of said rate of voltage rise, said rate control means including:

a predetermined value capacitor coupled between the gates of the SCR's;

a pair of predetermined value resistor means, each resistor being connected from one side of the line to one end of said capacitor, said capacitor and resistor pair forming a differentiator circuit for passing signal transients on said line above said predetermined limit directly to said SCR's.

2. The transient limiter of claim 1 further comprising: capacitor means coupled across said power line, said capacitor means being of predetermined capacitance to prevent a transient voltage from rising to a predetermined level prior to said solid state switching means switching to its low impedance state.

3. The transient limiter of either claims 1 or 2 wherein the voltage sensing means comprises Zener diode means, said Zener diode means producing a breakdown current at said predetermined voltage limit.

* * * * *